May 20, 1952     C. L. LONGMIRE     2,597,349
RADIO NAVIGATIONAL DEVICE
Filed Oct. 19, 1945     2 SHEETS—SHEET 1

INVENTOR.
CONRAD L. LONGMIRE
BY
William D. Hall.
ATTORNEY

May 20, 1952
C. L. LONGMIRE
2,597,349
RADIO NAVIGATIONAL DEVICE
Filed Oct. 19, 1945
2 SHEETS—SHEET 2
FIG. 2
FIG. 3
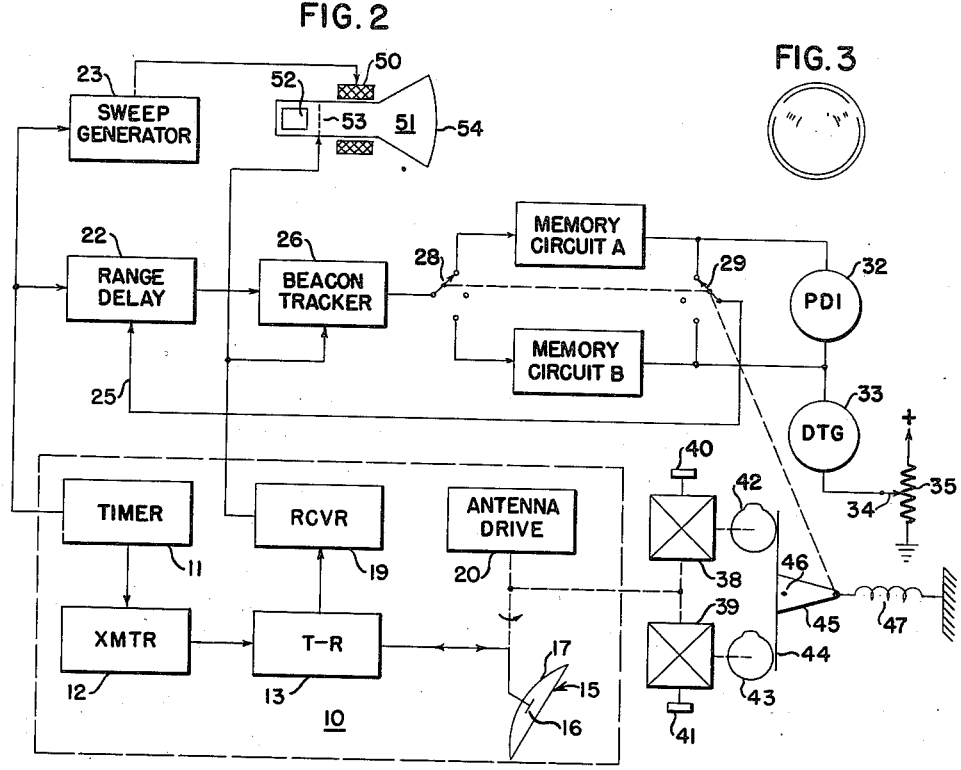
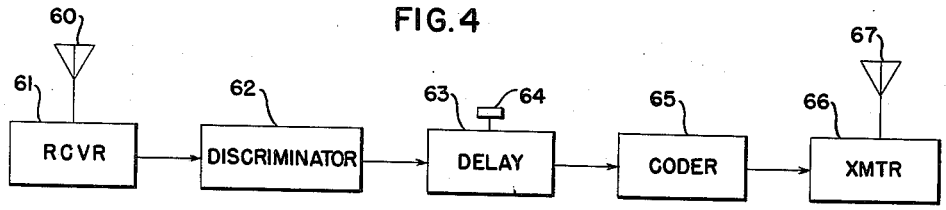
FIG. 4
*INVENTOR.*
CONRAD L. LONGMIRE
BY
*William D. Hall.*
ATTORNEY Patented May 20, 1952

2,597,349

UNITED STATES PATENT OFFICE 2,597,349

RADIO NAVIGATIONAL DEVICE

Conrad L. Longmire, Boston, Mass., assignor, by mesne assignments, to the United States of America as represented by the Secretary of War Application October 19, 1945, Serial No. 623,404

9 Claims. (Cl. 343—107)

This invention relates to electrical apparatus and more particularly to a system for accurately navigating an aircraft to a predetermined point.

In navigating an aircraft to a predetermined destination, use may be made of radio responder beacons having known positions. The beacons may be of the type which, when interrogated by the radio object indication apparatus carried by the aircraft, respond with a radio frequency reply. The time elapsing between the transmission of the interrogating pulse from the aircraft and the receipt by the aircraft of the beacon response determines the range from the aircraft to the beacon.

It is an object of this invention to provide a system whereby an aircraft may be accurately navigated to a predetermined destination by the use of responder beacons.

It is a further object of this invention to arrange said system so that a minimum of equipment need be carried by the aircraft and so that a minimum of special adjustment of the equipment in the aircraft is necessary for each destination.

Other objects, features, and advantages of this invention will suggest themselves to those skilled in the art and will become apparent from the following description of the invention taken in connection with the accompanying drawing in which:

Fig. 2 is a block diagram of beacon tracking apparatus carried by the aircraft;

Fig. 3 is an elevation view of the indicator screen of Fig. 2;

Fig. 4 is a block diagram of a radio responder beacon used in the system of this invention.

Figure 1:
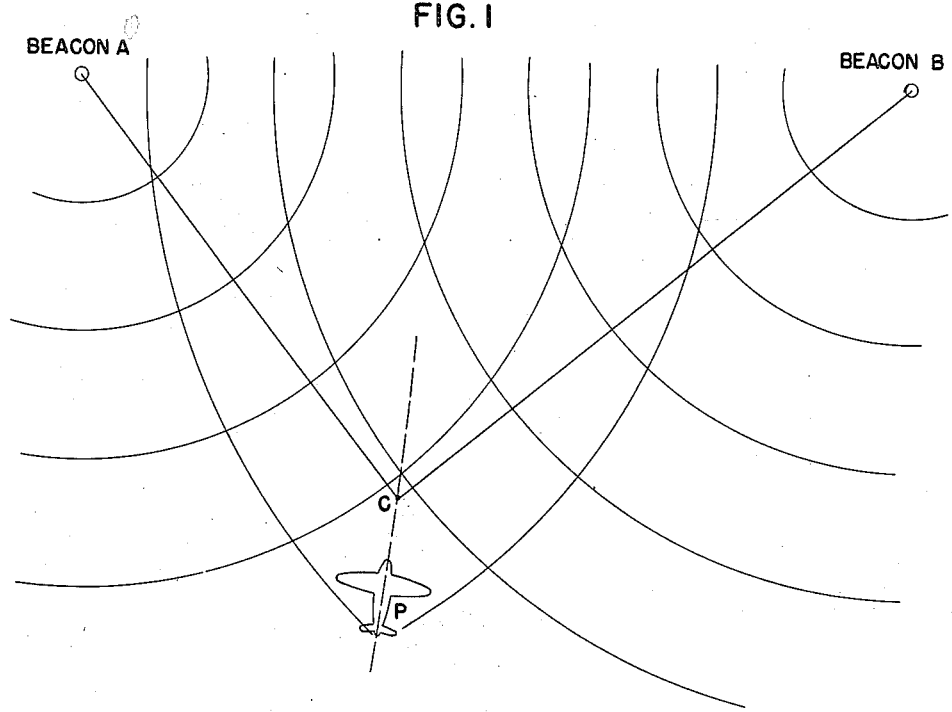
Fig. 1 is a diagram used in explaining one method of beacon navigation.

Reference is now made more particularly to Fig. 1 for a general explanation of one navigational method known as the hyperbolic approach. Beacons A and B represent radio responder beacons. C represents the destination, and P the aircraft. If bombs are to be dropped, point C becomes the bomb release point and is determined from the position of the target by predetermining the altitude, speed, and heading of the aircraft at the bomb release point and by predicting the velocity and direction of the wind at the expected time of bomb release. In this approach, aircraft P flies a hyperbolic path passing through destination C, the hyperbolic path traveled being the locus of points from which the two beacons of the aircraft respond with a constant time difference. This time difference is inserted as a constant delay in the response of the beacon nearer the destination. The aircraft will then be flown on the proper hyperbolic course, if the ranges of the two beacons are indicated as equal.

Reference is now made to Fig. 2 for a description of the beacon interrogating and tracking apparatus carried by the aircraft. Radio object detection apparatus 10 includes a timer 11 which controls the operation of transmitter 12 to cause the latter to produce equally spaced pulses of radio frequency energy through transmit-receive (T-R) switch 13 to antenna 15. Antenna 15 includes dipole 16 and reflector 17. Antenna 15 is also connected through T-R switch 13 to receiver 19. Antenna 15 is rotated about a vertical axis by antenna drive 20.

Timer 11 also supplies reference pulses in synchronism with the R.-F. pulses produced by transmitter 12 to range delay circuit 22 and sweep circuit 23. Range delay circuit 22 may consist of any circuit capable of delaying the reference pulse in accordance with a control voltage received through line 25. The delayed reference pulse from range delay circuit 22 is supplied to beacon tracker circuit 26. The beacon response is also supplied to beacon tracker 26 from receiver 19.

Beacon tracker 26 may be any circuit capable of comparing the times of arrival of the reference pulse and the beacon response, and producing an output indicative of the magnitude and sense of the difference between the times of arrival of the two pulses. Such a circuit is disclosed in the application by Andrew B. Jacobsen, Serial No. 584,233, entitled "Electrical Circuit," filed March 22, 1945.

The output of beacon tracker 26 is applied through switch 28 to either memory circuit A or memory circuit B. Memory circuits A and B may each consist of any circuit capable of receiving intermittently an error voltage from beacon tracker 26 and producing a continuous output voltage proportional to the range corresponding to said error voltage, said output varying continuously in accordance with the range to the beacon being tracked. A suitable circuit is described in the above mentioned application by Andrew B. Jacobsen, Serial No. 584,233.

The outputs of memory circuits A and B are applied to switch 29 and line 25 to control range delay circuit 22. The outputs of memory circuits A and B are also applied to pilot's direction indicator, PDI, 32 which is a meter capable of comparing two voltages. The output of memory circuit B is applied to distance-to-go meter, DTG, 33 where it is compared with a voltage picked up by contactor 34 which is adjustable along potentiometer 35. Potentiometer 35 is connected between a source of positive potential and ground.

An indication of antenna rotation is supplied by differential gear assemblies 38 and 39 which are provided with adjusting knobs 40 and 41, respectively. The outputs of differentials 38 and 39 drive cams 42 and 43, respectively, each of which is circular except for a short raised portion. Cam follower 44 is arranged to coact with cams 42 and 43 and is mounted on member 45 which is pivoted at end 46 and attached to spring 47 which tends to maintain follower 44 in a vertical position. Member 45 is connected with switches 28 and 29.

Sweep circuit 23 supplies a deflection wave to deflection coils 50 of cathode ray tube 51 which also includes electron gun 52, control grid 53, and fluorescent screen 54.

Reference is now made to Fig. 4 for a description of apparatus in each of the radio responder beacons at fixed positions on the ground. The beacon includes a receiving antenna 60 connected to a receiver 61, the output of which is fed to discriminator 62. Discriminator 62 may be any circuit capable of giving an output pulse only when the output pulse is of a predetermined length; one circuit for discriminator 62 will be described below with reference to Fig. 5. The output of discriminator 62 is applied to delay circuit 63 which is provided with a knob 64 for adjusting the amount of delay introduced. Delay circuit 63 may be any circuit capable of producing adjustable delay and may consist of a liquid delay line including a crystal for producing a supersonic wave, a tubular container filled with liquid through which the wave travels, and a pick-up device for producing a pulse when the supersonic wave reaches the end of the tube.

The output of delay circuit 63 is applied to coder 65. Coder 65 may consist of any circuit capable of receiving a triggered pulse, and producing a series of pulses spaced in accordance with a predetermined code. Circuit 65 may consist of a series of multivibrator circuits arranged so that each circuit triggers the succeeding circuit and the parts of each arranged so that the combined outputs produce the predetermined code.

The output of coder 65 is applied to transmitter 66 causing the latter to emit pulses spaced in accordance with said code, via transmitting antenna 67.

Figure 5:
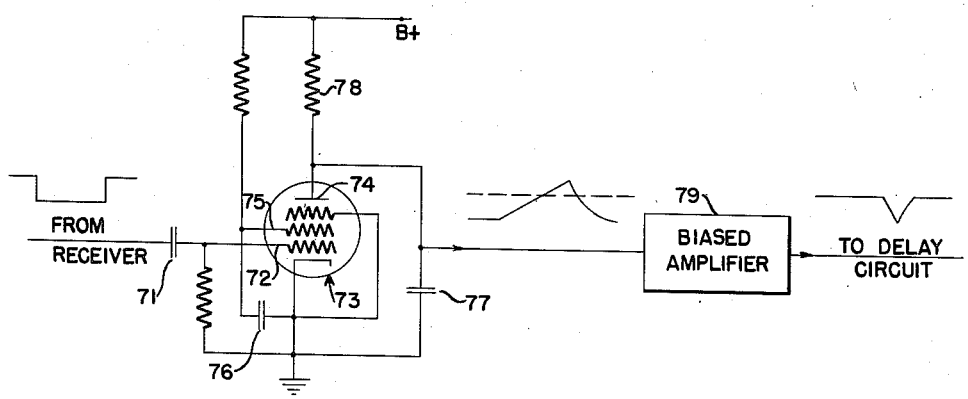
Fig. 5 is a schematic diagram of a discriminator which may be used in Fig. 4.

Reference is now made more particularly to Fig. 5 for a description of one possible discriminator circuit which may be used in the beacon of Fig. 4. The video signal from receiver 61, in the form of a negative voltage pulse of approximately rectangular shape, is applied through condenser 71 to grid 72 of tube 73. At the beginning of each input pulse, the current through plate 74 decreases abruptly. Screen 75 is bypassed to ground via condenser 76, so as to maintain substantially constant screen potential. Condenser 77 then charges exponentially through resistor 78, the latter being relatively large so that the charging curve is substantially linear in the interval defined by the beginning and ending of the input pulse. The end of the input pulse returns tube 73 to a conducting condition so that condenser 77 discharges with a relatively short time constant.

The output voltage from plate 74 is applied to biased amplifier 79, which is normally biased below cutoff. Hence only receiver pulses exceeding a certain minimum length can produce an output pulse for application to delay circuit 63.

In the operation of the system shown in Fig. 2 and 4, timer 11 causes transmitter 12 to transmit, through transmit-receive switch 13 to antenna 15, a series of equally spaced radio frequency pulses. Transmit-receive switch 13 is for the purpose of preventing the transmitted pulses from entering receiver 19 and for preventing the received pulses from entering transmitter 12. Antenna 15 radiates a directional beam of radio pulses. When the antenna 15 points toward beacon receiving antenna 60, the received pulses will be transmitted through receiver 61 to discriminator 62. If the received pulse is of the predetermined duration, a delayed pulse will be produced by delay circuit 63. This delayed pulse will be applied to coder 65, which will produce a coded series of pulses for transmission by transmitter 66 and antenna 67.

The beacon response will be received by antenna 15 and transmitted through transmit-receive switch 13 to receiver 19. At the time of the transmission of the interrogating pulse, timer 11 will have supplied a reference pulse to range delay circuit 22 which will delay the reference pulse in accordance with the expected range of the interrogated beacon. The delayed reference pulse and the beacon response will be compared by beacon tracker 26 and, if the two do not occur simultaneously in time, an error voltage will be generated.

Differential 38 will have been adjusted by knob 40 so that when the antenna 15 points toward antenna 60, the raised portion of cam 42 will coact with cam follower 44 and operate through member 45 to connect switches 28 and 29 with memory circuit A. The error voltage from beacon tracker 26 is therefore applied to memory circuit A and the range voltage produced by memory circuit A will be connected through switch 29 and line 25 to range delay circuit 22 where a delay proportional to the range to the beacon being interrogated will be produced.

Knob 41 of differential 39 will have been adjusted so that when antenna 15 points toward another beacon of a construction similar to that shown in Fig. 4, switches 28 and 29 will be connected to memory circuit B, through the action of cam 43, follower 44, and member 45. When switches 28 and 29 are connected with memory circuit B, range delay circuit 22 will produce a delay proportional to the range to the beacon being interrogated and beacon tracker 26 will apply to memory circuit B, an error voltage corresponding to that beacon. Cams 42 and 43 are so arranged that switches 28 and 29 will be in a neutral position, except through two arcs of about 15° of rotation of antenna 15, each of said arcs being approximately centered on the direction to one of the beacons being tracked.

If the relay in circuit 63 of Fig. 4 is adjusted to correspond to a range distance equal to the difference between AC and BC as seen in Fig. 1; then the aircraft will fly a hyperbolic path passing through the destination C; if the range voltages produced by memory circuits A and B are indicated by PDI meter 32 to be equal.

Contactor 34 is adjusted along potentiometer 35 to apply to DTG meter 33, a voltage corresponding to the range from the destination C to beacon B. When the range voltage produced by memory circuit B is indicated by DTG meter 33 to be equal to the voltage picked up by contactor 34 the aircraft P is at its destination C. A bomb release circuit may be arranged to drop bombs when these voltages become equal.

While there has been described what is at present considered to be the preferred embodiment of this invention, it will be obvious to those skilled in the art that various changes and modifications may be made therein without departing from the scope of the invention as set forth in the appended claims.

The invention claimed is:

1. A system of navigating a craft toward a given target comprising a pair of fixed responding beacons, the distances of which with respect to said target have been predetermined, means for interrogating each of said pairs of responding beacons from said craft, means for delaying the operative response of the beacon nearer to the target to the interrogation from said craft, the delay of the response corresponding to the difference in respective distances of said two beacons to said target, comparing means for obtaining at said craft a differential of the response times of said two beacons to said interrogation as an indication of the relative distances of the craft from each beacon, whereby the error in the course of said craft may be determined.

2. A system as set forth in claim 1 further including means for translating the response time to one beacon and the response time from the beacon to the target into measurable quantities for the purpose of differential comparison.

3. A system according to claim 1, wherein said interrogation means includes means for transmitting periodic pulses to said beacons and means for receiving responding pulses from said beacons, and wherein said comparing means includes means for alternately generating a first voltage proportional to the time interval between the transmitting of a periodic pulse and the receiving of responding pulses from one beacon and for generating a second voltage proportional to the time interval between the transmitting of a periodic pulse and the receiving of a responding pulse from the other beacon, and comparator means coupled to said voltage generating means for indicating the difference between said first and second voltages.

4. A system according to claim 3, further including means for generating a third voltage proportional to the distance between one beacon and said target, and means for indicating the difference between said third voltage and said first voltage, whereby the equality of said first and third voltages is an indication of the arrival of the craft at its target.

5. A system as defined in claim 3, wherein said voltage generating means includes a delay means coupled to said transmitting means for generating an output pulse at a certain time interval after the transmitting of a periodic pulse; means coupled to said delay means and to said receiving means for producing a voltage pulse proportional to the time interval between an output pulse from said delay means and a received responding pulse; first and second memory circuits, each for producing a continuous voltage proportional to said voltage pulse upon said voltage pulse being applied thereto; drive means for effecting the alternate receiving by said receiving means of responding pulses from each respective beacon; switching means operating in synchronism with said drive means for alternately applying said voltage pulse to each of said respective first and second memory circuits coincidentally with the receiving of responding pulses from each respective beacon, and for simultaneously with the application of said voltage pulse to each of said memory circuits applying the continuous voltage therefrom to the delay means for controlling the length of said certain time interval in proportion to said continuous voltage, and means for applying the continuous voltage from said first and second memory circuits to said comparator means.

6. A system as defined in claim 5, further including means for visually displaying at said moving craft the distances of said moving craft from each beacon.

7. A system as defined in claim 1, wherein at least one of said beacons includes a discriminator for rendering said beacon effective for responding only to interrogations having at least a given length of duration.

8. In a beacon in a system for navigating a moving craft, said system having an interrogator on said craft and a pair of fixed beacons; a discriminator in at least one of said beacons, comprising an electron tube having at least a cathode, a control electrode, and an anode, means including an anode load resistor connected to said tube to render said tube normally conducting, means for supplying an interrogation pulse having a negative polarity to the control electrode of said tube to thereby render said tube non-conducting, a capacitor shunting the anode and cathode of said tube and forming with said anode load resistor a charging circuit having given exponential charging characteristic during the duration of said interrogation having a negative polarity, and an amplifier normally biased beyond cutoff connected across said capacitor, whereby said amplifier only has an output when the duration of said negative received pulse has at least a given length of duration; and said beacon further including means connected to said amplifier for effecting the transmitting of a responding pulse to said interrogator in response to said amplifier output.

9. The combination according to claim 8, further including means for delaying the transmission of the output of said amplifier.

CONRAD L. LONGMIRE.

REFERENCES CITED

The following references are of record in the file of this patent:

UNITED STATES PATENTS

| Number | Name | Date |
|---|---|---|
| 2,321,698 | Nold | June 15, 1943 |
| 2,403,626 | Wolff | July 9, 1946 |
| 2,405,238 | Seeley | Aug. 6, 1946 |
| 2,405,239 | Seeley | Aug. 6, 1946 |
| 2,406,970 | Smith | Sept. 3, 1946 |
| 2,407,287 | Labin | Sept. 10, 1946 |
| 2,408,048 | Deloraine | Sept. 24, 1946 |
| 2,441,956 | Deloraine et al. | May 25, 1948 |
| 2,508,565 | Chance | May 23, 1950 |